United States Patent Office 2,823,189
Patented Feb. 11, 1958

2,823,189

POLYAMIDE-EPOXY RESIN REACTION PRODUCT

Don E. Floyd, Robbinsdale, Minn., assignor to General Mills, Inc., a corporation of Delaware No Drawing. Application July 15, 1953
Serial No. 368,217

6 Claims. (Cl. 260—18)

The present invention relates to the reaction products of certain polyamides derived from polymeric fat acids and epoxy resins.

In the copending application of Malcolm M. Renfrew and Harold Wittcoff, Serial No. 276,054, filed March 11, 1952, now Patent 2,705,223, there are disclosed the reaction products of certain polyamide resins derived from polymeric fat acids with epoxy resins. These compositions are shown to possess unusual and desirable properties. The reaction product is a hard, infusible, insoluble, resinous material with a desirable degree of flexibility such that the products are not brittle.

It has now been found that by employing polyamide resins made from mixtures of polymeric fat acids and dimerized rosin, the cured compositions obtained from these polyamide resins with epoxy resins have greater hardness, improved compatibility and more rapid dry to the tack free stage.

It is, therefore, an object of the present invention to provide a novel polyamide-epoxy resin reaction product in which the polyamide is derived from a mixture of polymeric fat acids and dimerized rosin.

The present invention is applicable to epoxy resins in general. These epoxy resins are complex polymeric reaction products of polyhydric phenols with polyfunctional halohydrins such as epichlorhydrin and glycerol dichlorhydrin. Usually the difunctional chlorhydrin is used in proportions in excess of that equivalent to the polyhydric phenol and less than that which is twice the equivalent amount. The reaction is carried out in the presence of caustic alkali which is usually employed in at least the quantity necessary to combine with the halogen liberated from the halohydrin, and usually is employed in excess. The products obtained may contain terminal epoxy groups or terminal epoxy groups and terminal primary hydroxyl groups. In the complex reaction mixture the terminal epoxy groups are generally in excess of the terminal primary hydroxyl groups. Typical polyhydric phenols include resorcinol, and various bisphenols resulting from the condensation of phenol with aldehydes and ketones such as formaldehyde, acetaldehyde, acetone, methyl ethyl ketone and the like. Resins of this type are disclosed in Greenlee Patent 2,585,115 and these resins are useful in the present invention.

The molecular weight of the epoxy resins may be controlled by the relative proportions of the reactants, as well as by the extent to which the reaction is carried on. The present invention involving the curing of these epoxy resins may be applied to all epoxy resins. The molecular weight of the resin is not critical since both very low molecular weight resins, as well as very high molecular weight resins, can be cured by this method. The properties of the cured resin compositions may, of course, vary with the molecular weight of the epoxy resin employed, as well as the nature and molecular weight of the polyamide employed.

The polyamides which may be used with these epoxy resins are those derived from a mixture of polymeric fat acids and dimerized rosin with polyalkylene polyamines. The polymeric fat acids employed in preparing the polyamides are those resulting from the polymerization of drying or semi-drying oils or from the free acids or simple aliphatic alcohol esters of such acids. Suitable drying or semi-drying oils include soybean, linseed, tung, perilla, oiticica, cottonseed, corn, tall, sunflower, safflower, dehydrated castor oil and the like. In the polymerization process for the preparation of the polymeric fat acids, the fatty acids with sufficient double bond functionality combine, for the most part probably by a Diels-Adler mechanism, to provide a mixture of dibasic and higher polymeric acids. The acids with insufficient functionality to react remain as monomers and may be wholly or partially removed, for example by distillation. The residue after distillation consists of the desired polymeric acids and this mixture is used for the preparation of the polyamide resin. In place of this method of polymerization, any other method of polymerization may be employed whether the resultant polymer possesses residual unsaturation or not. The term "polymeric fat acids" as used herein is intended to include the polymerized mixture of acids employed, which mixture usually contains a predominant portion of dimeric acids, a smaller quantity of trimeric and higher polymeric acids, and some residual monomer. The amount of monomer which the product contains may be varied to produce a variety of products. The monomer tends to restrict the size of the polyamide obtained and frequently it is desirable to employ a substantial quantity of monomer such that a liquid or at least flowable polyamide product is obtained.

These polymeric fat acids may be reacted with a variety of polyalkylene polyamines for the production of the polyamide. Suitable polyamines include diethylene triamine, triethylene tetramine, 3,3'-imino-bis-propylamine, and similar polyalkylene polyamines. The amidification reaction may be carried out under the usual conditions employed for this purpose. Polyamides of this type generally have molecular weights varying from 1,000–10,000 and are resistant to the corrosive action of water, alkali, acids, oils, greases and organic solvents. The melting points vary depending upon the reactants and the reaction conditions. Low melting polyamide resins melting within the approximate range of 25–90° C. are preferred. Higher or lower melting points are also suitable for the present invention.

The dimerized rosin employed is essentially a dimeric rosin acid. This type of material is available under the trade names of Dymerex Resin (Hercules Powder Co.) and Dimer 120 (Newport Industries). Considerable variation is possible in the amount of dimerized rosin which is employed. Some improvement in hardness, compatibility and drying properties are observed even with the small quantities of, for example, 0.05 equivalents per equivalent of polymeric fat acids. The quantity of rosin dimer should not exceed 1 equivalent per equivalent of polymeric fat acids, otherwise there is a tendency for the mixed polyamides and epoxy resins to become brittle when cured. The polyamides should have an amine number within the range of 20–250. By amine number is intended the number of milligrams of potassium hydroxide equivalent to the free amine groups in one gram of resin. The reaction with the epoxy resin occurs through the amine group and accordingly with amine numbers lower than 20 there is a tendency toward low reactivity. On the other hand when amine numbers exceed 250, there is a tendency for some odor to the product and some volatility resulting in loss of product during curing.

The polyamides have been found to contribute desirable properties to the epoxy resins even at very low concentrations. Thus, quantities of from 2-5% of the polyamides based on the weight of the polyamide-epoxy resin mixture are effective as flow additives for epoxy resins. Generally, however, it is preferred to employ larger concentrations of the polyamide, especially from 20-80% of the polyamide based on the combined weights of the resins.

The mixed resins may be obtained by blending separate solutions of the resins in suitable solvents. The polyamides are soluble in aromatic hydrocarbons such as toluene admixed with aliphatic alcohols such as isopropanol, n-butanol and the like. The epoxy resins are soluble principally in ketone solvents. The two resins may be separately dissolved and the solutions mixed to obtain a composition which may be cured. The solutions may be prepared at reduced temperature, room temperature, or elevated temperature, and the mixed compositions may be cured at room temperature or above. It is also possible to prepare mixed resins without the employment of solvents by simply mixing the resins and fusing them. The mixed resins, either by themselves or in the form of solutions, may be applied by molding, pouring, dipping, brushing, casting or spraying.

EXAMPLE 1

A polyamide was prepared by heating together the following ingredients:

|  | G. |
|---|---|
| Polymeric fat acids (0.75 equivalent) | 217 |
| Dimerized rosin—Dimer 120 (0.25 equivalent) | 97 |
| Distilled cottonseed-type fatty acids (0.06 equiv.) | 18.8 |
| Diethylene triamine, 98% pure (1.56 equivalent) | 54.6 |

The reaction mixture was heated to 200° C. and stirred for three hours. Vacuum was applied to the system during the last hour. The product was removed from the reaction vessel and cooled. It had the following properties:

| Ball and ring melting point | 73° C. |
|---|---|
| Acid number | 34.1. |
| Amine number | 86.8. |
| Viscosity (35% solution in 1:1 butanol:toluene) | A2 Gardner-Holdt. |
| Color | 11-12 Gardner 1933. |

This resin was found to give thermoset, cured products in combination with epoxy resins, as illustrated below.

The following blends were prepared:

| Parts Polyamide | Parts Epon 834 | Properties on Curing for 24 hours at 125° C. |
|---|---|---|
| 50 | 50 | Compatible, hard. |
| 30 | 70 | Compatible, very hard, resilient. |
| 70 | 30 | Compatible, hard, resilient. |

| Parts Polyamide | Parts Epon 828 | Properties on Curing for 24 hours at 125° C. |
|---|---|---|
| 50 | 50 | Compatible, hard, resilient. |

| Parts Polyamide | Parts Epon 1001 | Properties on Curing for 24 hours at 125° C. |
|---|---|---|
| 50 | 50 | Compatible, hard. |
| 30 | 70 | Compatible, very hard, resilient. |
| 70 | 30 | Compatible, hard, resilient. |

Coating formulations were prepared by mixing together solutions of the polyamide (at 50% solids in equal parts of isopropanol and toluene) with various epoxy resin solutions (at 50% solids in equal parts of methyl ethyl ketone and toluene.) Films were cast on glass and tin panels with a 1½ mil blade. The properties are tabulated below.

*Air dry films*

| Composition (by wt.) | Rocker Hardness | | |
|---|---|---|---|
| | 1 day | 4 days | 7 days |
| 1. {50 Epon 834 / 50 Polyamide} | 17 | 41 | 47 |
| 2. {50 Epon 1001 / 50 Polyamide} | 38 | 55 | 61 |
| 3. {70 Epon 834 / 30 Polyamide} | 5 | 8 | 10 |
| 4. {70 Epon 1001 / 30 Polyamide} | 21 | 50 | 50 |
| 5. {30 Epon 1001 / 70 Polyamide} | 44 | 45 |  |

*Baked films (at 300° F. for 20 minutes)*

| Composition (by wt.) | Rocker Hardness |
|---|---|
| 1. {50 Epon 834 / 50 Polyamide} | 59 |
| 2. {50 Epon 1001 / 50 Polyamide} | 63 |
| 3. {70 Epon 834 / 30 Polyamide} | 21 |
| 4. {70 Epon 1001 / 30 Polyamide} | 73 |
| 5. {30 Epon 1001 / 70 Polyamide} | 57 |

EXAMPLE 2

A polyamide was prepared, following the procedure outlined in Example 1, from the following ingredients:

|  | G. |
|---|---|
| Polymeric fat acids | 225 |
| Dimerized rosin-Dimer 120 | 100.5 |
| Distilled cottonseed-type fatty acids | 265.5 |
| Diethylene triamine | 88.5 |

The product was a viscous, resinous liquid. The properties of the resin were found to be as follows:

| Acid number | 21.5. |
|---|---|
| Amine number | 69.1. |
| Viscosity (35% solution in 1:1 butanol:toluene solution) | A4-A5 (Gardner-Holdt). |
| Color | 12 Gardner 1933. |

A mixture of a portion of this polyamide and an equal amount of Epon 834 was prepared by stirring the two materials together at room temperature. On curing at 125° C. overnight a compatible, hard, resilient, thermoset resin body was obtained.

EXAMPLE 3

A polyamide was prepared as in Example 2 from the following ingredients:

|  | G. |
|---|---|
| Polymeric fat acids | 225 |
| Dimerized rosin—Dymerex resin | 115 |
| Distilled cottonseed-type fatty acids | 256.5 |
| Diethylene triamine | 88.5 |

The product was a viscous, resinous liquid, having the following properties:

| Acid number | 22.6. |
|---|---|
| Amine number | 70.4. |
| Viscosity (35% solution in 1:1 butanol:toluene solution) | A4-A5 (Gardner-Holdt). |
| Color | 10-11 Gardner 1933. |

A mixture of a portion of this polyamide and an equal amount of Epon 834 was prepared by stirring the two materials together at room temperature. On curing at 125° C. overnight a compatible, hard, resilient, thermoset resin body was obtained.

EXAMPLE 4

A polyamide was prepared by heating together the following ingredients:

|  | G. |
|---|---|
| Polymeric fat acids (0.75 equivalent) | 217 |
| Dimerized rosin—Dimer 120 (0.25 equivalent) | 97 |
| Triethylene tetramine (2.65 equivalent) | 96.8 |

The reaction mixture was heated to 200° C. and stirred for three hours. Vacuum was applied to the system during the last hour. The product was removed from the reaction vessel and cooled. It had the following properties:

| | |
|---|---|
| Ball and ring melting point | 64.7° C. |
| Acid number | 31.4. |
| Amine number | 175.0. |
| Viscosity (35% solution in 1:1 butanol:toluene solution) | A2–A3 Gardner-Holdt. |
| Color | 11–12 Gardner 1933. |

Coating formulations were prepared and tested as in Example 1.

*Air dry films*

| Composition (by wt.) | Rocker Hardness ||| 
|---|---|---|---|
| | 1 day | 4 days | 6 days |
| 1. {50 Epon 1001 / 50 Polyamide} | 38 | 41 | |
| 2. {30 Epon 1001 / 70 Polyamide} | 17 | 16 | |
| 3. {70 Epon 1001 / 30 Polyamide} | 39 | 45 | 53 |
| 4. {50 Epon 1007 / 50 Polyamide} | 27 | 25 | |
| 5. {30 Epon 1007 / 70 Polyamide} | 13 | 11 | |
| 6. {70 Epon 1007 / 30 Polyamide} | 41 | 43 | |

*Baked films (at 300° F. for 20 minutes)*

| Composition | Rocker Hardness |
|---|---|
| 1. {50 Epon 1001 / 50 Polyamide} | 75 |
| 2. {30 Epon 1001 / 70 Polyamide} | 64 |
| 3. {70 Epon 1001 / 30 Polyamide} | 81 |
| 4. {50 Epon 1007 / 50 Polyamide} | 79 |
| 5. {30 Epon 1007 / 70 Polyamide} | 73 |
| 6. {70 Epon 1007 / 30 Polyamide} | 79 |

The resins known to the trade as Epon 828, Epon 834, Epon 1001, and Epon 1007 are made from bisphenol A and epichlorhydrin and have the following characteristics:

| | Melting Point, °C. | Color—Gardner 1933 | Viscosity, Gardner-Holdt | Epoxide Equivalent |
|---|---|---|---|---|
| Epon 828 | 8–12 | 12 max | Z5–Z6+ | 190– 210 |
| Epon 834 | 20–28 | [1] 10 max | A2–A1 | 225– 290 |
| Epon 1001 | 64–76 | [1] 8 max | C–G | 450– 525 |
| Epon 1007 | 127–133 | [1] 8 max | Y–Z | 1,550–2,000 |

[1] 40% solutions in Butyl Carbitol.

I claim as my invention:

1. Composition of matter comprising an epoxy resinous material containing terminal epoxy groups derived from a polyhydric phenol and epichlorohydrin and having an epoxide equivalency in the range of 190 to 2000, and a polymeric polyamide derived from a mixture of polymeric fat acids and dimerized rosin and a polyalkylene polyamine said polyamide containing free amine groups.

2. Composition according to claim 1 in which the dimerized rosin is employed in a concentration of from .05–1 equivalent per equivalent of polymeric fat acids.

3. Composition according to claim 1 in which the polyamide has an amine number of from 20–250.

4. Composition according to claim 1 in which the polyalkylene polyamine employed is diethylene triamine.

5. Composition according to claim 1 in which the polyalkylene polyamine employed is triethylene tetramine.

6. Composition of matter comprising an epoxy resinous material containing terminal epoxy groups derived from a polyhydric phenol and epichlorohydrin and having an epoxide equivalency in the range of 190 to 2000, and a polymeric polyamide derived from diethylene triamine and a mixture of polymeric fat acids and dimerized rosin, the dimerized rosin being employed in the ratio of from .05–1 equivalent per equivalent of dimerized polymeric fat acid, the polyamide having an amine number of from 20–250 and being employed in the ratio of from 2–80% based on the combined weights of the resins.

References Cited in the file of this patent

UNITED STATES PATENTS

| 2,450,940 | Cowan | Oct. 28, 1948 |
|---|---|---|
| 2,589,245 | Greenlee | Mar. 18, 1952 |